United States Patent [19]

Appriou et al.

[11] Patent Number: 5,068,664
[45] Date of Patent: Nov. 26, 1991

[54] METHOD AND DEVICE FOR RECOGNIZING A TARGET

[75] Inventors: Alain Appriou, Saclay; Régis Barthelemy, Les Ulis; Colette Coulombeix, Chatenay Malabry, all of France

[73] Assignee: Societe Nationale Industrielle et Aerospatiale, Paris, France

[21] Appl. No.: 602,488

[22] Filed: Oct. 24, 1990

[30] Foreign Application Priority Data

Oct. 24, 1989 [FR] France .................... 89 13928

[51] Int. Cl.$^5$ .................... G01S 7/295; G06K 9/64
[52] U.S. Cl. .................... 342/90; 342/192; 342/195; 382/39
[58] Field of Search .................... 342/90, 195, 192, 13; 382/17, 39

[56] References Cited

U.S. PATENT DOCUMENTS

| | | | |
|---|---|---|---|
| 3,634,822 | 1/1972 | Chow | 382/39 |
| 4,462,081 | 7/1984 | Lehan | 364/554 |
| 4,707,697 | 11/1987 | Coulter et al. | 342/90 X |
| 4,847,817 | 7/1989 | Au et al. | 367/135 |
| 4,864,307 | 9/1989 | Potage et al. | 342/192 |
| 4,881,270 | 11/1989 | Knecht et al. | 382/17 |
| 4,972,193 | 11/1990 | Rice | 342/90 |

FOREIGN PATENT DOCUMENTS 0235946 9/1987 European Pat. Off. .
2593608 7/1987 France .

OTHER PUBLICATIONS

Proceedings of the 1988 IEEE National Radar Conference, 20–21 Apr. 1988, pp. 157–164, Vannicola et al., "Applications of Knowledge Based Systems to Surveillance".

Ksienski et al., "Low Frequency Approach to Target Identification", Proc. of the IEEE, vol. 63, No. 12, pp. 1651–1660, Dec. 1975.

*Primary Examiner*—Gilberto Barrón, Jr.
*Attorney, Agent, or Firm*—Marshall, O'Toole, Gerstein, Murray & Bicknell

[57] ABSTRACT

A method and device are disclosed for recognizing a target (T) among a plurality of n known targets Ti (with i=1, 2, 3, ..., n).

According to the invention, by direct examination of said target (T) to be recognized and from first values (Cki) representative of a plurality of p recognition criteria Ck (with k=1, 2, 3, ..., p), at least p third values (pCk(Ti)) are established representative of the probabilities that, for each recognition criterion (Ck), the target (T) to be recognized is each of said known targets (Ti); and said third values associated with the same known target (Ti) are merged while taking into account second values (PCk(Ti)) representative of the probabilities that a target (Ti) is recognized, in so far as criterion Ck is concerned, when it is examined so as to obtain n fourth values (p(Ti)), each of which is representative of the probability that the target to be recognized is one of the known targets (Ti).

9 Claims, 8 Drawing Sheets

METHOD AND DEVICE FOR RECOGNIZING A TARGET

BACKGROUND OF THE INVENTION

The present invention relates to a method and device for recognizing a target among a plurality of known targets.

Such a method is already known. In this known method, by means of an appropriate sensor, for example a radar, or by reconstitution from models or plans, the value of a criterion (for example a radar signature) is determined for each of the known targets of said plurality of targets. The signals thus obtained are subjected to shaping, then are stored in a memory to form a data bank. After this preparatory step, it is possible to pass to the recognition step. In this recognition step, the sensor collects the signals coming from the target to be recognized. These signals, after pre-processing, are compared with those contained in said data bank and recognition of the target is given by the result of the comparison.

Because of the imperfections of the sensors used, the processing method, the conditions of observing the target during recognition by the sensor, etc . . . , the probability of recognizing one of the targets of the plurality during the recognition step remains limited.

SUMMARY OF THE INVENTION

The object of the present invention is to overcome this drawback and to substantially improve such recognition probability.

For this, according to the invention, the method for recognizing a target (T) among a plurality of n known targets Ti (with i=1, 2, 3, . . . , n), is remarkable in that:

in a first preparatory step, for each of said known targets (Ti) first values (Cki) are determined representative of a plurality of p recognition criteria Ck (with k=1, 2, 3, . . . , p);

in a second preparatory step, from direct examination of said n known targets (Ti), using said first values (Cki) and for each recognition criterion (Ck), at least n second values (PCk(Ti)) are established representative of the probabilities for a target (Ti) to be recognized when it is examined; and in a step for recognizing said target:

by direct examination of said target (T) to be recognized and from said first values (Cki) determined by said first preparatory step, at least p third values (pCk(Ti)) are established representative of the probabilities, for each recognition criterion (Ck), that the target (T) to be recognized is each of said known targets (Ti);

said third values associated with the same known target (Ti) are merged together while taking into account said second values, so as to obtain n fourth values (p(Ti)), each of which is representative of the probability that the target to be recognized is one of the known targets (Ti); and the identity of the target to be recognized (T) is determined from the largest of said fourth values.

Thus, in the present invention, a plurality of criteria are used and not, as in the above recalled prior art, a single criterion. This plurality of criteria, which corresponds to complementary magnitudes, is merged mathematically so that the merging guarantees the propriety. Because of the use of a plurality of criteria, the recognition probability is substantially improved. It is all the greater the larger the number of merged criteria, to the extent that they have a good complementarity of discrimination. As will be seen hereafter, each of the criteria used may be of the type defining the form, the polarization, etc . . . , of the response of an observed target.

The merging laws used for merging the criteria may be diverse. However, preferably, those given by BAYES inference, by the entropy maximum, by the theory of evidence or by the theory of fuzzy sets are used.

A bibliographic list will be given of works in which these theories are described.

(1) A. APPRIOU

"Interêt des theories de l'incertain en fusion de données"

Colloque International sur le Radar Paris, 24–28 avril 1989

(2) A. APPRIOU

"Procédure d'aide à la de,gra/e/ cision multi-informateurs. Applications à la classification multi-capteurs de cibles"

Symposium de l'Avionics Panel (AGARD) Turquie, 25–29 avril 1988

[3] K. J. ARROW "Social choice and individual valves"

John Wiley and Sons Inc - 1963

[4] D. BLAIR, R. POLLAK

"La logique du choix collectif" Pour la Science - 1983

[5] A. SCHARLIC

"Décider sur plusieurs criteres. Panorama de l'aide à la décision multicritère" Presses Polytechniques Romandes - 1985

[6] R. L. KEENEY, B. RAIFFA "Décisions with multiple objectives: Preferences and value tradeoffs"

John Wiley and Sons - New York - 1976

[7] R. J. JEFFREY

"The logic of decision"

The university of Chicago Press, Ltd. - London - 1983 (2nd Edi.)

[8] B. ROY

"Classements et choix en présence de points de vue multiples"

R.I.R.O.—2ème année—n° 8—1968—p.p 57-75

[9] B. ROY

"Electre III: un algorithme de classements fondé sur une représentation floue des preferences en presence de crite,gra/e/ res multiples"

Cahiers du CERO—Vol. 20 - n° 1 - 1978- p.p. 3-24

[10] R. O. DUDA, P. E. HART, M. J. NILSSON

"Subjective Bayesian methods for rule-based inference systems"

Technical Note 124—Artificial Intelligence Center—SRI International

[11] R. K. BHATNAGAR, L. N. KAMAL

"Handling uncertain information: a review of numeric and non-numeric methods"

Uncertainty in Artificial Intelligence—L. N. KAMAL and J. F. LEMMER (editors)—1986

[12] A. P. DEMPSTER

"Upper and lower probabilities induced by a multivalued mapping"

Annals of mathematical Statistics—n° 38—1967

[13] A. P. DEMPSTER

"A generalization of Bayesian inference"

Journal of the Royal Statistical Society—Vol. 30—Serie B—1968

[14] G. SHAFER

"A mathematical theory of evidence"

Princeton University Press—Princeton—New Jersey—1976

[15] D. DUBOIS, N. PRADE
"Combination of uncertainty with belief functions: a reexamination"
Proceedings 9th International Joint Conference on Artificial Intelligence—Los Angeles—1985

[16] H. E. KYBURG
"Bayesian and non Bayesian evidential updating"
Artificial Intelligence—31—1987—p.p. 271-293

[17] P.V. FUA
"Using probability density functions in the framework of evidential reasoning Uncertainty in knowledge based systems"
B. BOUCHON, R. R. YAGER, eds. Springer Verlag—1987

[18] J. J. CHAO, E. DRAKOPOULOS, C. C. LEE
"An evidential reasoning approach to distributed multiple hypothesis detection"
Proceedings of the 20th Conference on decision and control—Los Angeles, Calif.—December 1987

[19] R. R. YAGER
"Entropy and specificity in a mathematical theory of Evidence"
Int J. General Systems—1983—Vol. 9—p.p. 249-260

[20] M. ISHIZUKA
"Inference methods based on extended Dempster and Shafer's theory for problems with uncertainty/fuzziness"
New Generation Computing—1—1983 OHMSHA, Ltd, and Springer Verlag—p.p. 159-168

[21] L. A. ZADEH
"Fuzzy sets"
Information and Control n° 8—1965—p.p. 338-353

[22] L. A. ZADEH
"Probability measures of fuzzy events"
Journal of Mathematical Analysis and Applications—Vol. 23—1968—p.p. 421-427

[23] A. KAUFMANN
"Introduction a la theorie des sous-ensembles flous"
Vol. 1, 2 et 3—Masson—Paris—1975

[24] M. SUGENO
"Theory of fuzzy integrals and its applications"
Tokyo Institute of Technology—1974

[25] R. E. BELLMAN, L. A. ZADEH
"Decision making in a fuzzy environment"
Management Science, Vol. 17, No 4—December 1970

[26] D. DUBOIS, N. PRADE
"Fuzzy sets and systems—Theory and applications"
Academic Press—New York—1980

[27] L. A. ZADEH
"Fuzzy sets as a basis for a theory of possibility"
Fuzzy sets and Systems 1—1978—p.p. 3-28

(28) D. DUBOIS
"Modèles mathe,gra/e/ matiques de l'impre,gra/e/cis et de l'incertain en vue d'applications aux techniques d'aide à la dècision"
Thèse de Docteur d'Etat ès Sciences Universite de Grenoble—1983

(29) D. DUBOIS, N. PRADE
"Thèorie des possibilités: application à la representation des connaissances en informatique"
Masson—Paris—1985

At the time of merging said third values, said second values are used as indices representative of the quality of each recognition criterion. It goes without saying that, at the time of merging, other indices could be used, for example of quality, confidence, or preference.

It will be noted that such merging may be carried out on certain magnitudes or on uncertain magnitudes, i.e. defined by an interval of values.

In an advantageous embodiment, the method according to the invention is further remarkable in that:

in said second preparatory step, for each criterion $C_k$, nxp second values $PC_k(T)$ are established each representative of the probability that the target ($T_i$) is recognized, whereas it is the target ($T_j$) which is examined ($j = 1, 2, 3, \ldots, n$);

in the recognition step:

third values $pC_k(T_i)$ are established representative of the probabilities that the target (T) to be recognized is each of said n known targets ($T_i$) in so far as each of said p criteria is concerned;

the nxp third values associated with the same target ($T_i$) are merged together by taking into account said nxp second values.

It is advantageous, in said first preparatory step, for said first values to be recorded criterion by criterion for all said known targets ($T_i$), so that all said first values of all said targets corresponding to a criterion are grouped together.

Said first values may be determined by direct examination of said known targets ($T_i$) or else from models or plans of said known targets.

Preferably, in said second preparatory step, said second values are obtained by comparison of said first values with measurement of each of said targets in accordance with each of said criteria, said measurements being repeated numerous times.

Said second values are advantageously recorded in matrix memories, each matrix memory being associated with a criterion and in each recording position of such a matrix memory the probability being recorded, for said criterion, that the target is recognized whereas another known target is subjected to direct examination.

The present invention in addition relates to a device for recognizing a target (T) among a plurality of n known targets $T_i$ (with $i = 1, 2, 3, \ldots, n$). According to the invention, this device is remarkable in that it comprises:

detection means capable of examining said target (T) and delivering at least one value for each of a plurality p of recognition criteria $C_k$ (with $k = 1, 2, \ldots, p$);

first storage means in which first values ($C_{ki}$) are recorded representative, for each of said known targets ($T_i$), of said plurality of recognition criteria $C_k$;

comparison means in which said values delivered by said detection means and said first recorded values are compared;

second storage means in which second values $PC_k(T_i)$ are recorded representative of the probability, for each criterion $C_k$, that a known target ($T_i$) is recognized;

a plurality of computing means associated respectively with a known target ($T_i$) connected to the outputs of said comparison means and said second storage means and able to provide, known target by known target, merging of the results of the comparison made by said comparison means while taking into account said second values; and a maximum device receiving the outputs of said computing means and delivering at its output the identity of the target (T) to be recognized.

Advantageously, said first storage means comprise a plurality of p memories each of which contains, for a particular criterion Ck, the values of said particular criterion Ck for all the known targets (Ti).

Furthermore, preferably, said second storage means comprise a plurality of p matrix memories each of which contains, for a particular criterion Ck, said second values PCk(Ti) for all the known targets (Ti).

Said comparison means may be formed by a plurality of individual comparators each of which compares a value coming from said detection means with one of said first values.

BRIEF DESCRIPTION OF THE DRAWINGS

The figures of the accompanying drawings will better show how the invention may be put into practice. In these figures, identical references designate similar elements.

DESCRIPTION OF THE PREFERRED EMBODIMENT

Figure 1:
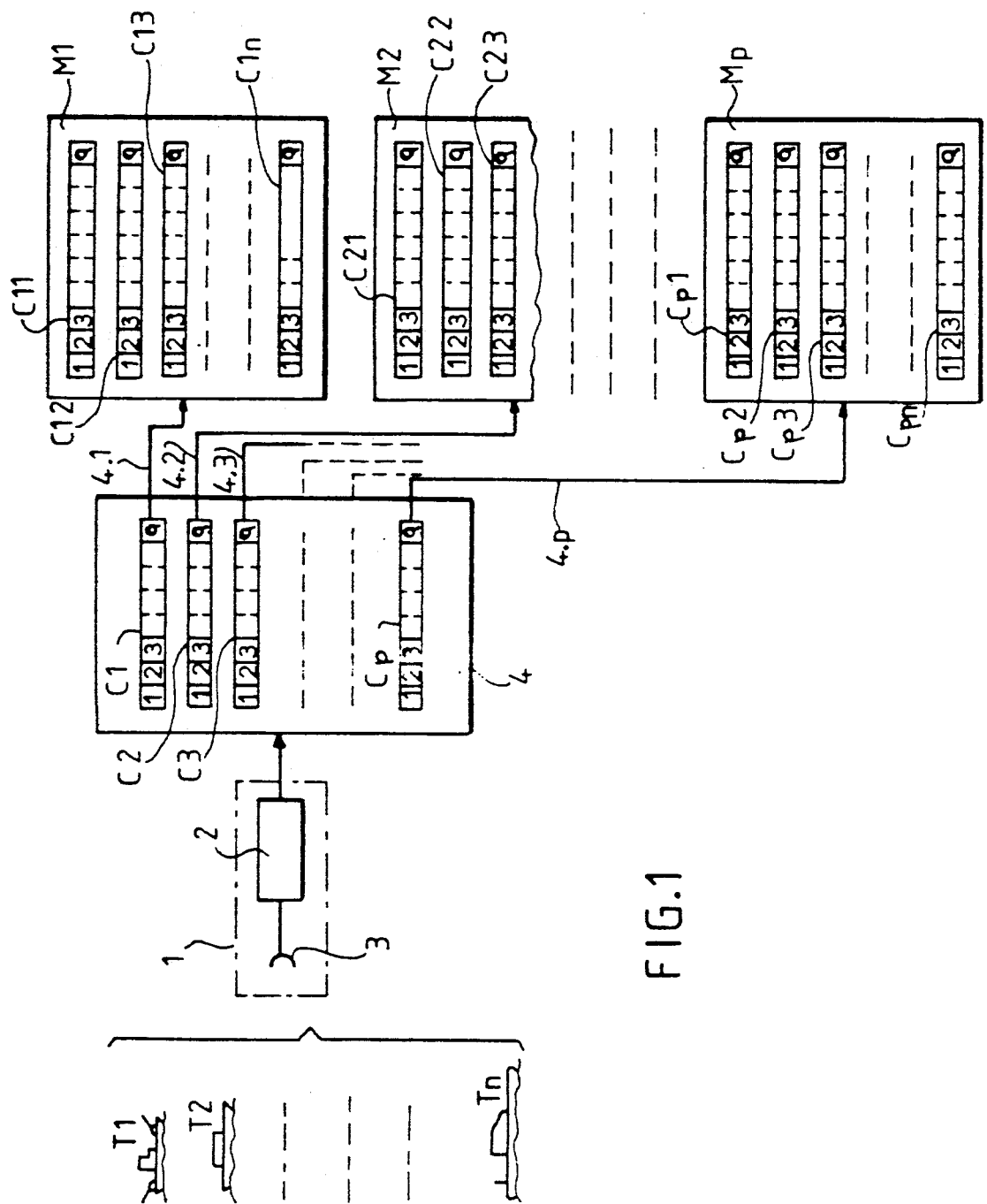
FIG. 1 shows schematically the preparatory step of the method according to the invention.

The system shown schematically in FIG. 1 is for putting into practice the first preparatory step of the method according to the invention. This system comprises a sensor 1, formed for example by a radar 2 and its antenna 3, a device 4 for extracting desired characteristics (or criteria) from the signal generated by sensor 1, as well as a plurality of p memories M1 to Mp.

A plurality of n potential targets T1 to Tn is presented in front of sensor 1. It observes said targets successively one by one and device 4 delivers, for each target observed, a plurality of p criteria C1 to Cp, each of said criteria having q values.

Among the criteria used may be mentioned:

criteria defining the form of the non coherent pulsed radar response of a target observed (length, inertia, mean self correlation function, . . . );

criteria defining the form of the radar response of a target to different frequencies;

criteria defining the form of the Doppler signature of a target;

criteria defining the form of the radar response of a target as a function of its relative attitude with respect to the sensor;

polarization of the radar response of a target observed with respect to the polarization emitted by the radar;

criteria defining the form of the target in a high resolution type image SAR (Synthetic Aperture Radar) or ISAR (Inverse Synthetic Aperture Radar), (moments, Fourier coefficients, . . . ) or its texture.

Thus, for each target T1 to Tn observed, the extraction device 4 delivers p criteria C1 to Cp, each of these criteria being in the form of a set of q values as a function of the parameter considered (attitude, distance, frequency, polarization, etc . . . ).

The target T1 is presented first of all to sensor 1 and the parameter on which criterion C1 depends is varied.

For q particular values of this parameter, the extraction device 4 delivers at its output 4.1 the q corresponding values of criterion C1, which are recorded in a zone C11 of memory M1. In an identical way, the parameter on which criterion C2 depends may be varied and, for q particular values of this parameter, which may be the same as the preceding one, the extraction device 4 delivers at its output 4.2 the q corresponding values of criterion C2, which are recorded in a zone C21 of memory M2. Similar operations are carried out for all the other criteria up to criterion Cp, appearing at the output 4p of the device 4, whose q values are recorded in a zone Cp1 of memory Mp.

Then target T1 is replaced by target T2 in front of sensor 1 and, in a way identical to that described above, q values are measured of each of the criteria C1 to Cp for said target T2. The plurality values of criterion C1 of target T2 are recorded in a zone C12 of memory M1, the q values of criterion C2 for target T2 are recorded in a zone C22 in memory M2 etc . . . , and the q values for the criterion Cp for target T2 are recorded in a zone Cp2 of memory Mp.

The above described procedure is repeated for each of the following targets T3 to Tn and each time:

the q values of criterion C1 for target T3 are recorded in a zone C13 of memory M1;

the q values of criterion C2 for target T3 are recorded in a zone C23 of memory M2;

etc . . .

the q values of criterion Cp for target T3 are recorded in a zone Cp3 of memory Mp;

etc . . .

the q values of criterion C1 for target Tn are recorded in a zone C1n of memory M1;

the q values of criterion C2 for target Tn are recorded in a zone C2n of memory M2;

etc . . .

the q values of criterion Cp for target Tn are recorded in a zone Cpn of memory Mp.

Thus, the n zones C11 to C1, of memory M1 contain the q values of criterion C1 respectively for the n targets T1 to Tn; the n zones C21 to C2n, of memory M2 contain the q values of criterion C1 respectively for the n targets T1 to Tn; etc . . . and the n zones Cp1 to Cpn, of memory Mp contain the q values of criterion Cp respectively for the n targets T1 to Tn. The p memories M1 to Mp are therefore each associated with a criterion C1 to Cp and contain the value of the corresponding criterion for each of the targets T1 to Tn observed.

It will be noted that targets T1 to Tn used in the system of FIG. 1 may not be real targets, but models representative of said targets. It will be further noted that the first preparatory step of the method according to the invention is not necessarily an apprenticeship step, such as described in connection with FIG. 1, the apprenticeship only being a possibility for forming memories M1 to Mp. In fact, in the case where the physical characteristics of real targets are known, it is possible to charge the different zones C11, C12 . . . C1n, C21, C22 . . . C2n, C31 . . . Cpn of memories M1 to Mp with information obtained by a theoretical computation.

It will be further noted that instead of being delivered by a single sensor 1, as has been shown in FIGS. 1, the p criteria C1 to Cp could be obtained by means of two or more sensors.

Figure 2:
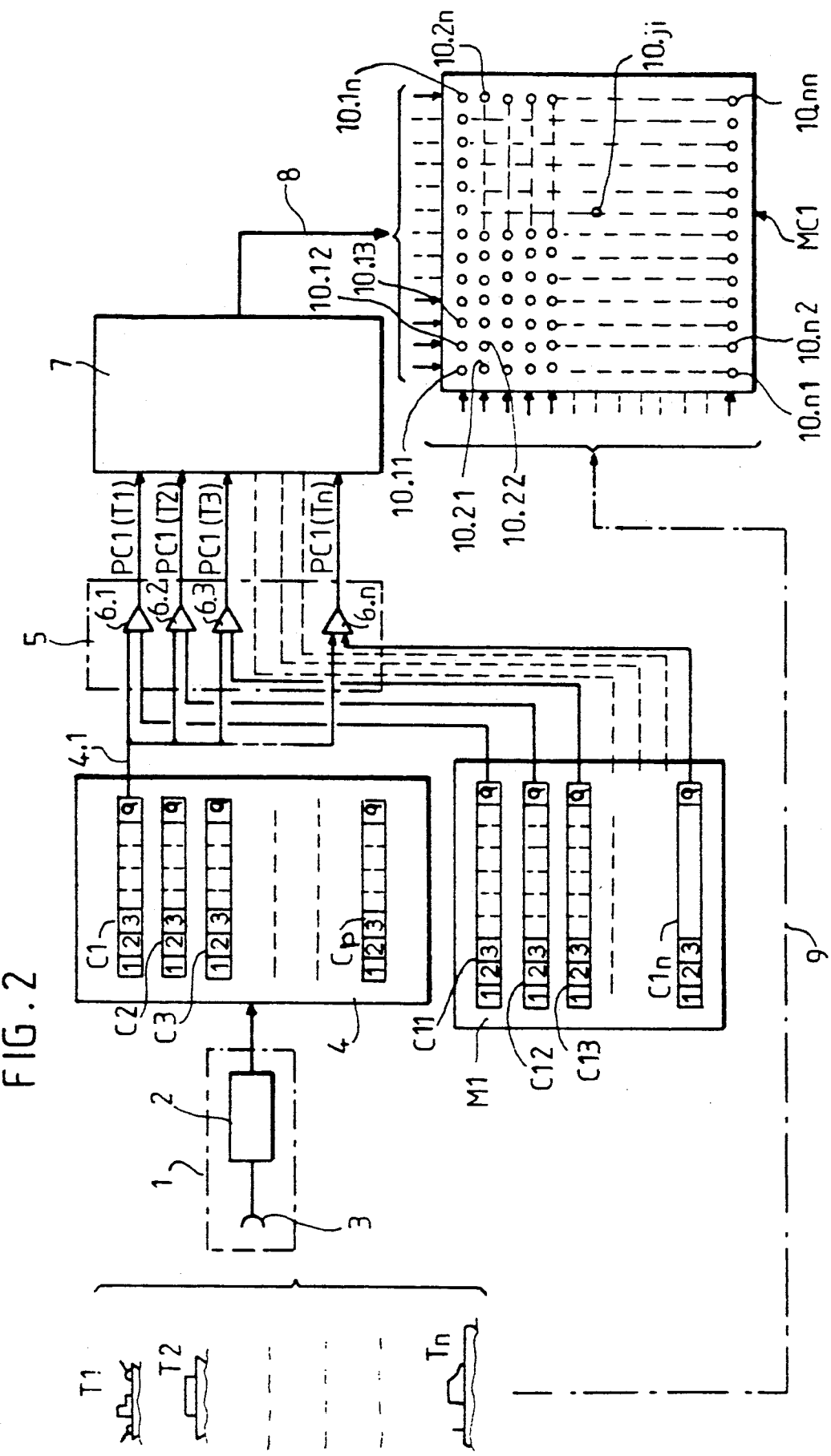
FIGS. 2, 3 and 4 illustrate schematically different phases of the second preparatory step of the method according to the invention.

FIG. 2 illustrates a first phase of the second preparatory step of the method according to the invention. In this figure, a system has been shown comprising, like the system of FIG. 1, the sensor 1 (or an identical sensor) and the extraction device 4. The system of FIG. 2 further comprises a comparison device comprising n comparators 6.1, 6.2, ... 6.n, as well as an optimization device 7, a matrix memory MC1 with n lines and n columns and the above described memory M1. The output 4.1 of the extraction device 4 is connected to an input of each of the comparators 6.1 to 6.n, whereas the other entries thereof are connected respectively to the zones C11 to C1n of memory M1. The outputs of comparators 6.1 to 6.n are connected to the optimization device 7. The output 8 of this device permits information to be written into the columns of the matrix memory MC1. Furthermore, a control 9 makes it possible to choose a writing line of said matrix memory.

The system shown in FIG. 2 operates in the following way:

A - (a) the target T1 is presented a first time to sensor 1 so that at the output 4.1 of the extraction device 4 there appears the present value of criterion C1 for target T1 being observed. In the comparator 6.1, this present value is compared with the corresponding value pre-recorded in zone C11 of memory M1 and at the output of said comparator 6.1 there appears a value representative of the probability that, in so far as criterion C1 is concerned, the target at present recognized by sensor 1 and the extraction device 4 is in fact target T1. Subsequently, this probability is noted PC1(T1). Of course, if sensor 1 and the recognition conditions were perfect this probability PC1(T1) would then be equal to 1.

Similarly, in comparator 6.2, the present value of criterion C1 for target T1 being examined is compared with the value pre-recorded in zone C12 of memory M1. This last pre-recorded value is relative to the value of criterion C1 for target T2. Thus, at the output of comparator 6.2 there appears a value representative of the probability that, in so far as criterion C1 is concerned, the target presently recognized by sensor 1 and extraction device 4 is the target T2. This probability is noted PC1(T2). Of course, if sensor 1 and the recognition conditions were perfect this probability PC1(T2) would then be equal to 0. Similarly, it can be seen that at the output of comparator 6.3 there appears a value representative of the probability PC1(T3) that, in so far as criterion C1 is concerned, the target presently recognized by sensor 1 and the extraction device is target T3.

The same goes for the different comparators 6.i (with i=1, 2, 3, ..., n) so that, with the first presentation of the target T1 to sensor 1, a first set of values of the probabilities PC1(T1), PC1(T2), PC1(T3), ... PC1(Tn) is addressed to the optimization device 7 which stores said first set of values.

(b) After storage of said first set of values of the probabilities PC1(Ti), the target T1 is presented for a second time to sensor 1 and, in a way similar to that described above, a second set of values is obtained for the probabilities PC1(Ti), which is also stored in the optimization device 7.

(c) Presentation of the target T1 to sensor 1 is repeated (N1-2) times so that in all N1 sets of values are obtained for the probabilities PC1(Ti), these N1 sets of values being stored in the optimization device 7.

(d) From these N1 sets of values, the optimization device 7 (which is for example of the maximum determination type, followed by counting of the different decisions and normalization by N1) determines a first single optimized set of the n values for the probabilities PC1(Ti), available at its output 8.

(e) This first single optimized set of values is then written into the first line of memory MC1, which is sensitized for this purpose by control 9, so that:

at position 10.11 of the first line and of the first column of the matrix MC1 the value PC1(T1) of said first single optimized set of values is recorded;

at position 10.12 of the first line and of the second column of the matrix MC1 the value PC1(T2) of the first single optimized set of values is recorded;

at position 10.13 of the first line and of the third column of the matrix MC1 the value PC1(T3) of said first single optimized set of values is recorded;

etc ...

at position 10.1n of the first line and of the $n^{th}$ column of the matrix MC1 the value PC1(Tn) of said first single optimized set of values is recorded. It can be seen that at any position 10.1i of the first line of matrix MC1 a value of PC1(Ti) is recorded corresponding to the probability that, in so far as criterion C1 is concerned, the target recognized is the target ti, whereas the target presented is the target T1.

B-(a) The different operations a to e of the above paragraph A are repeated but this time by presenting the target T2 to sensor 1 a large number of times N2. Of course, N2 may be equal to N1.

(b) Thus, at the output of the optimization device 7 of FIG. 2, a second single optimized set of values PC1(Ti) is obtained for the presentation of the target T2.

(c) Over the connection 9, the second line of matrix MC1 is now sensitized and this second set of values is written therein so that:

at position 10.21 of the second line and of the first column of matrix MC1 the value PC1(T1) of said second single optimized set of values is recorded;

at position 10.22 of the second line and of the second column of matrix MC1 the value PC1(T2) of said second single optimized set of values is recorded;

etc ...

at position 10.2n of the second line and of the $n^{th}$ column of matrix MC1 the value PC1(Tn) of said second single optimized set of values is recorded. Thus, at any position 10.2i of the second line of matrix MC1 a value of PC1(Ti) is recorded representative of the probability that, in so far as the criterion C1 is concerned, the target recognized is target Ti, whereas the target presented is target T2.

C-(a) The different operations a to c of the above paragraph b are repeated, by successively presenting each of the targets T3 to Tn in front of sensor 1 a large number of times and each time writing the single optimized set of values PC1(Ti) obtained in the corresponding line of the matrix memory MC1.

(b) Thus, at any position 10.ji of the matrix memory MC1 (with i=1, 2, 3, ..., n in so far as the columns of matrix MC1 is concerned and j=1, 2 3, ..., n in so far as the lines of said matrix is concerned), a value of PC1(Ti) is written representative of the probability that, in so far as the criterion C1 is concerned, the target recognized is the target Ti, whereas the target presented is the target Tj.

Figure 3:
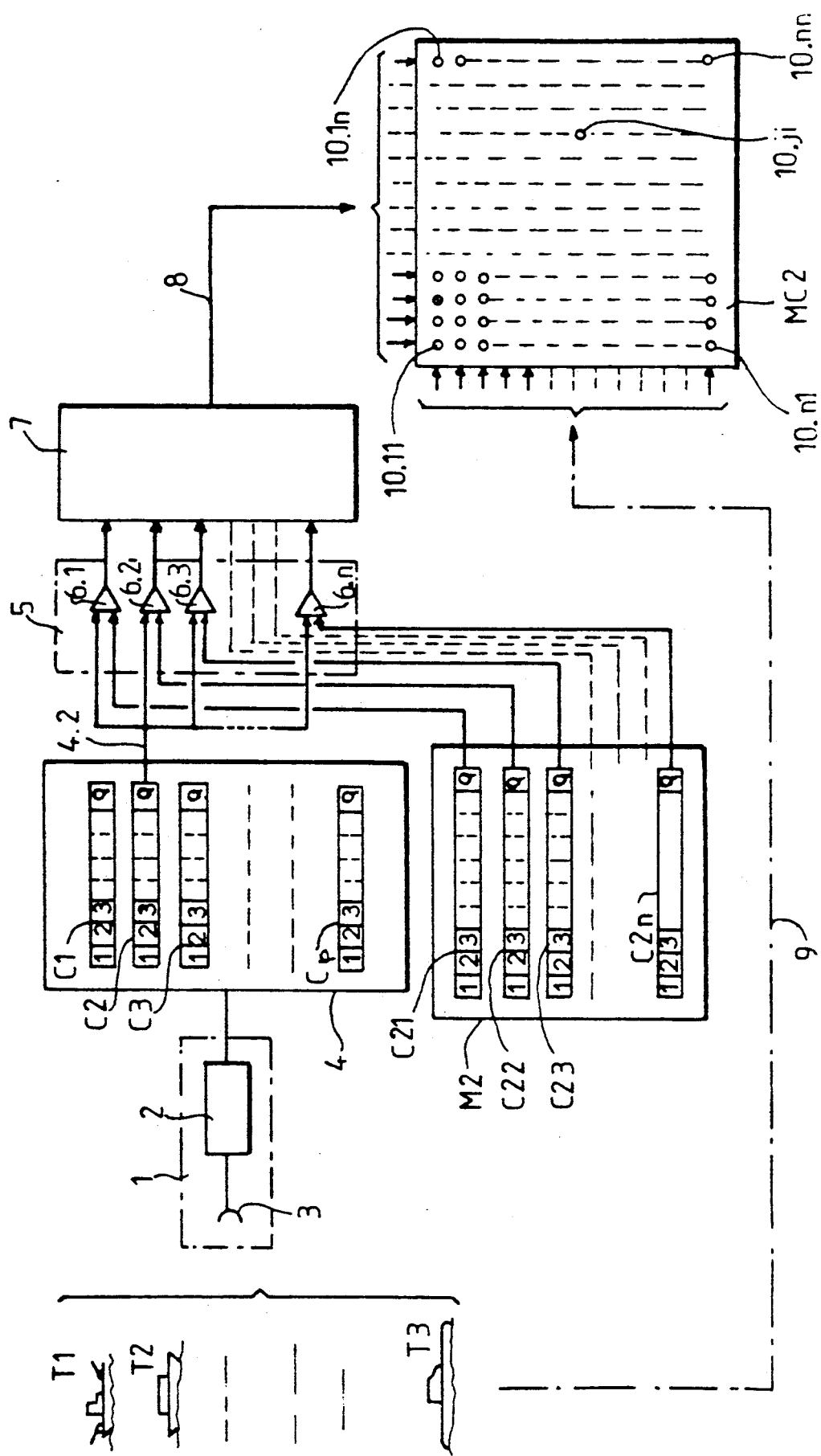

FIG. 3 illustrates a second phase of the second preparatory step of the method according to the invention. In this figure, we find again, as in FIG. 2, sensor 1, the extraction device 4, the comparison device 5, the optimization device 7 and control 9. However, memory M1 is replaced by memory M2 and the matrix memory MC1 by a matrix memory MC2, also having n lines and n columns. In this phase, the output 4.2 of the extraction device 4 is connected to an input of each of the comparators 6.1 to 6.n of device 5, whereas the other inputs of said comparators are connected respectively to the zones C21 to C2n of memory M2. The output 8 of the optimization device 7 controls writing into the columns of the matrix memory MC2 whereas writing into the lines thereof is controlled, as described for the matrix memory MC1 by the control 9.

With the device of FIG. 3, operations are carried out similar to those described in connection with FIG. 2, so that, at any position 10.ji of the matrix memory MC2 a value PC2(Ti) is written representative of the probability that, in so far as the criterion C2 is concerned, the target recognized is target Ti, whereas the target presented is in actual fact target Tj.

Similar operations are continued for each of memories M3, M4, ... Mp and each time a matrix memory MC3, MC4, ..., MCp is formed similarly to what was described above.

Figure 4:
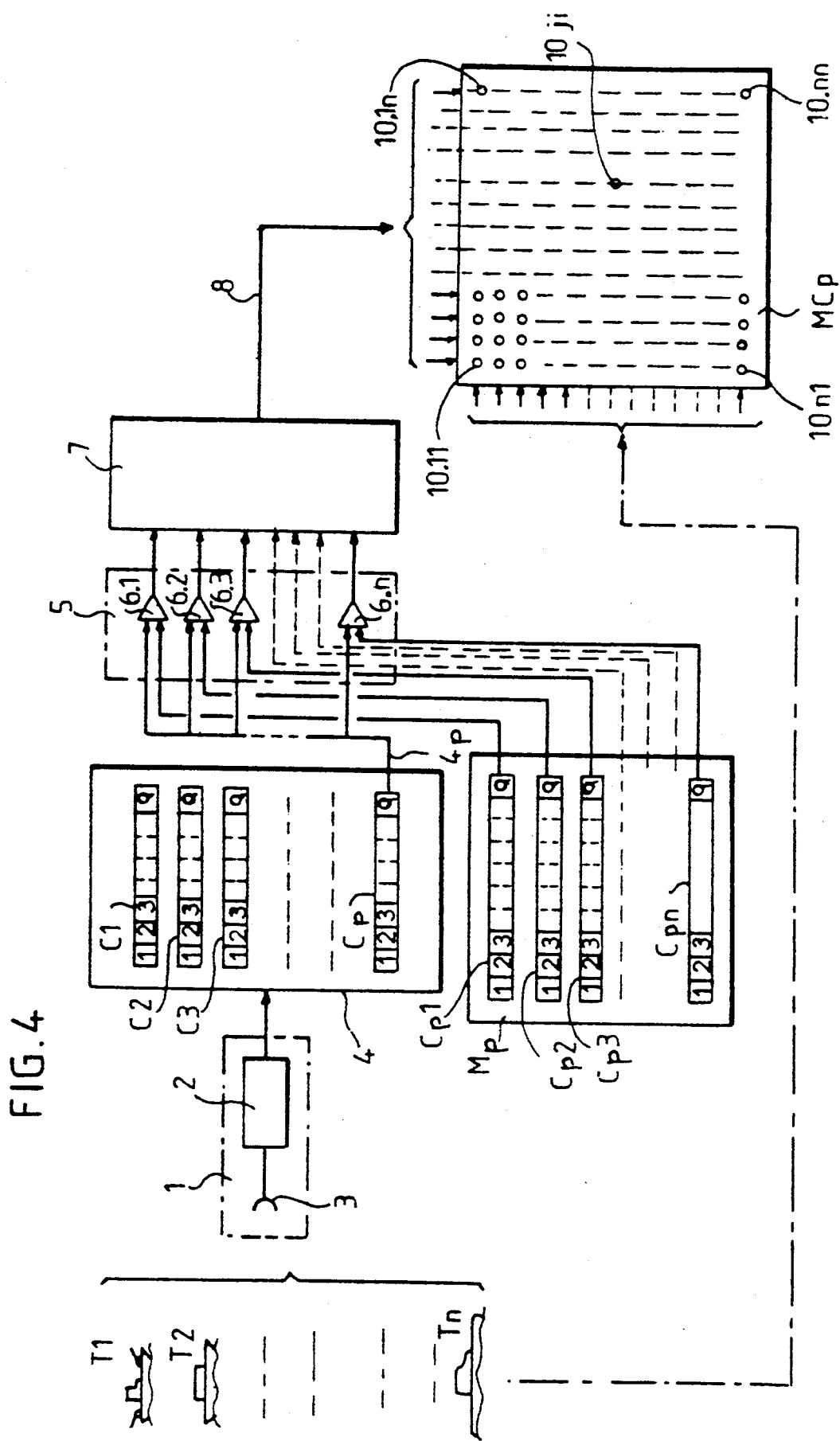

In FIG. 4, the $p^{th}$ and last phase of the second preparatory step of the method according to the invention has been illustrated. The output 4.p of the extraction device 4 is then connected to an input of each of the comparators 6.1 to 6.n of device 5, whereas the other inputs of said comparators are connected respectively to zones Cp1 to Cpn of memory Mp. The output 8 of the optimization device 7 controls writing into the columns of the matrix memory MCp, whereas, as before, writing into the columns thereof is controlled by control 9.

Referring to what was described above, it will be readily understood that, at any position 10.ji of the matrix memory MCp, a value PCp(Ti) is written representative of the probability that, in so far as criterion Cp is concerned the target recognized is target Ti, whereas the target presented is the target Tj.

Thus, the set of p matrix memories MC1 to MCp forms a bank of probabilities such that any position 10.ji of any matrix memory MCk (with k=1, 2, ..., p) contains a value PCk(Ti) representative of the probability that, in so far as the criterion C1k is concerned, the target recognized is the target ti, whereas the target presented is the target tj.

The matrix memories MC1 to MCp are also called hereafter confusion matrices.

Figure 5:
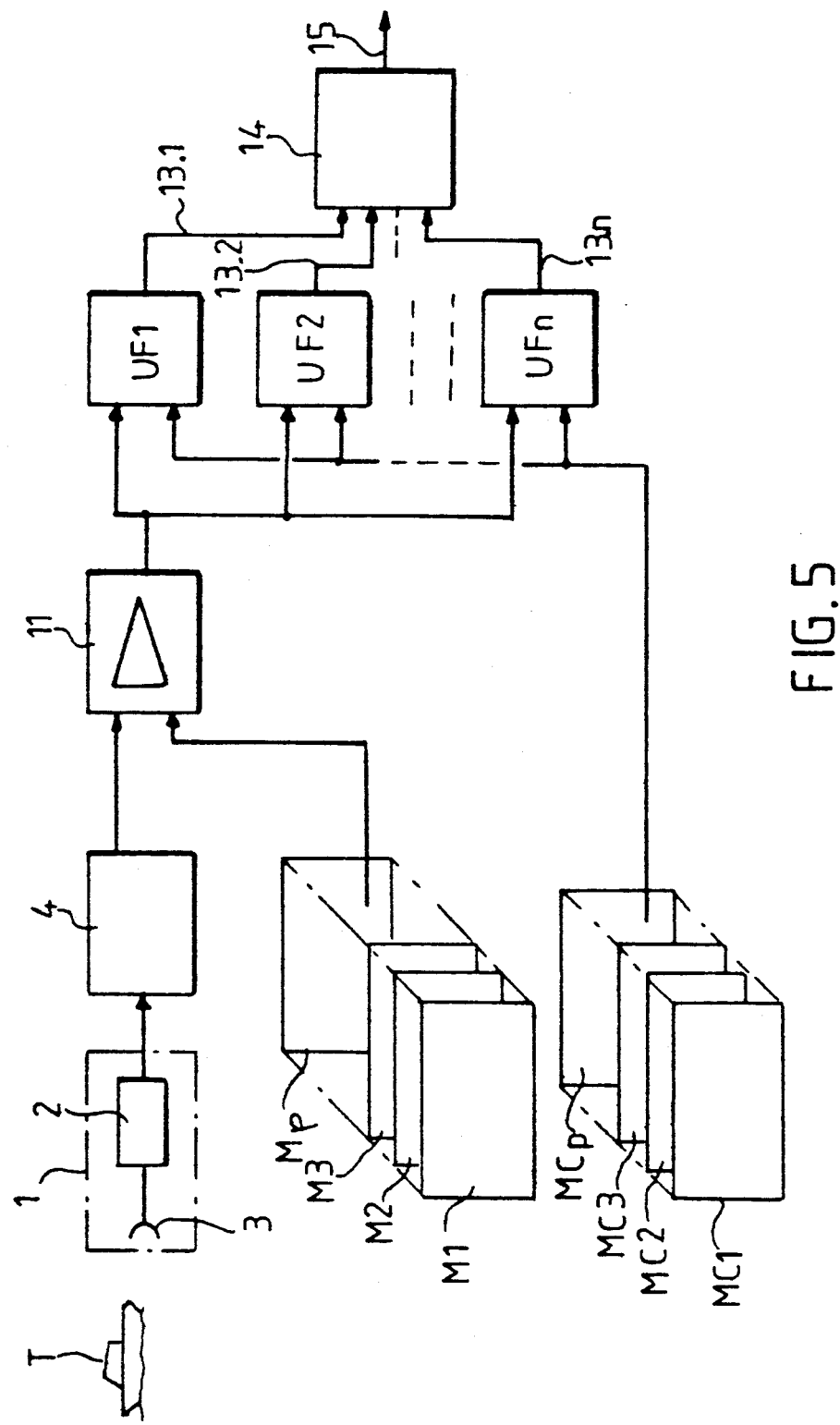
FIG. 5 shows a block diagram of the recognition device according to the invention.

FIG. 5 gives the general block diagram of the system according to the present invention for recognizing any target T, which is any one of the previously mentioned targets T1 to Tn, from information stored in memories M1 to Mp and in the confusion matrices MC1 to MCp.

The system shown in FIG. 5 comprises the sensor 1 (or an identical sensor) and the extraction device 4 (or an identical device), as well as the set of memories M1 to Mp and the set of confusion matrices MC1 to MCp. It further comprises a comparison device 11 including n assemblies 11.1 to 11.n each having p individual comparators 12.1 to 12.p (see FIGS. 6 to 8), as well as an assembly of n computing means or merging units UF1 to UFn, whose respective outputs 13.1 to 13.n are connected to a maximum optimization device 14, at the output 15 of which appears the result of identification of target T, i.e. the number i of the target Ti, with which the target T is recognized identical.

For this, the comparison device 11 receives the signals generated by the extraction device 4 as well as the contents of the matrices M1 to Mp and it forms differential signals which are addressed to the merging units UF1 to UFn. In addition, the latter receive the contents of the confusion matrices MC1 to MCp. They each merge these different signals and deliver at their output a signal representative of the probability that the target T presented to sensor 1 is one of the targets Ti. At the output 13.1 of the merging unit UF1, there appears a signal representative of the probability that the target T is the target T1, at output 13.2 of the merging unit UF2 appears a signal representative of the probability that the target T is the target T2, etc ..., and at the output 13.n of the merging unit UFn there appears a signal representative of the probability that the target T is a target Tn. These different signals representative of said probabilities are received by the optimization device 14, which designates at its output those of the targets Ti formed by the target T.

Figure 6:
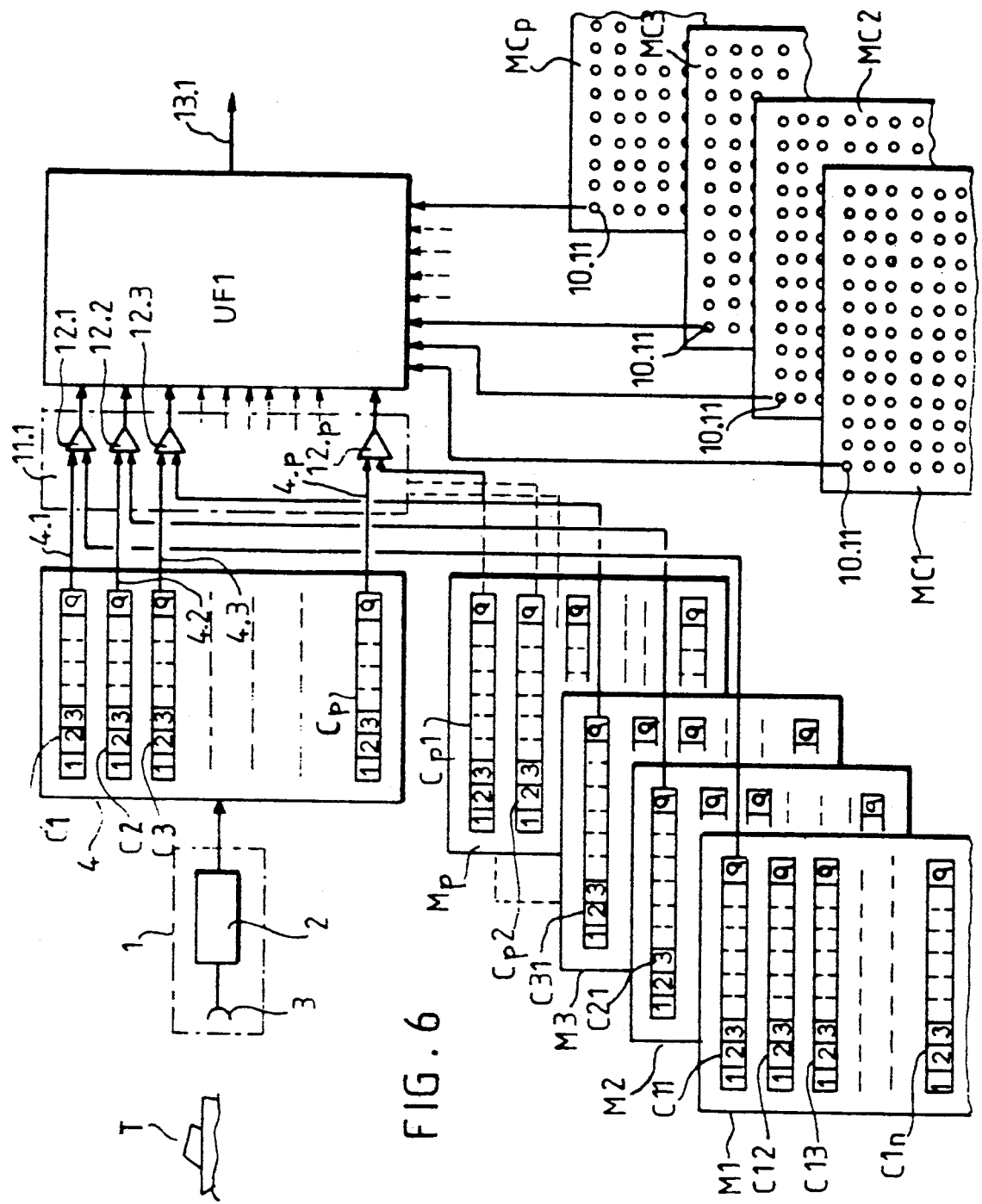
FIGS. 6, 7 and 8 illustrate schematically different phases of the recognition step of the method according to the invention, in a simplified embodiment.
Figure 7:
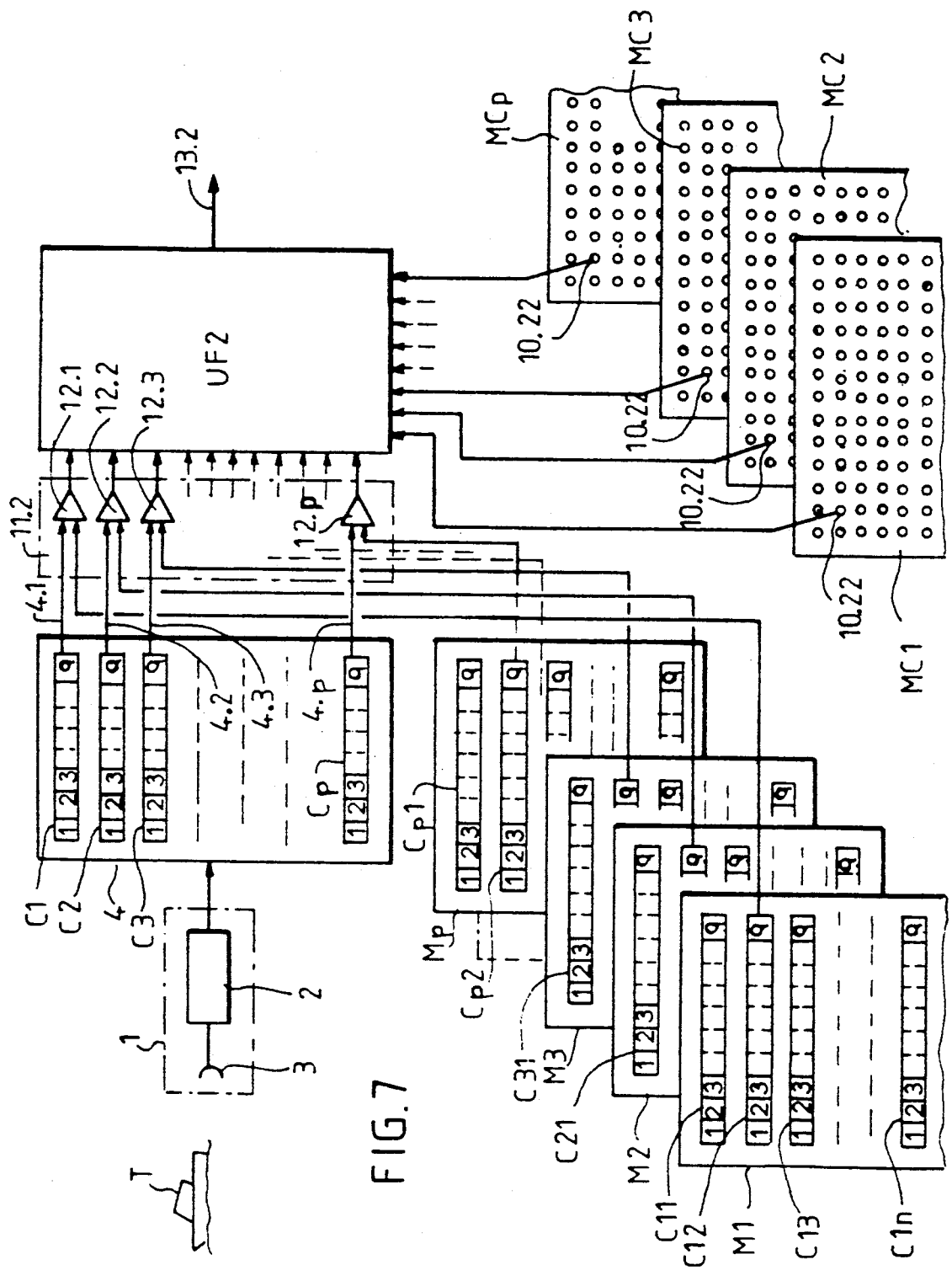
Figure 8:
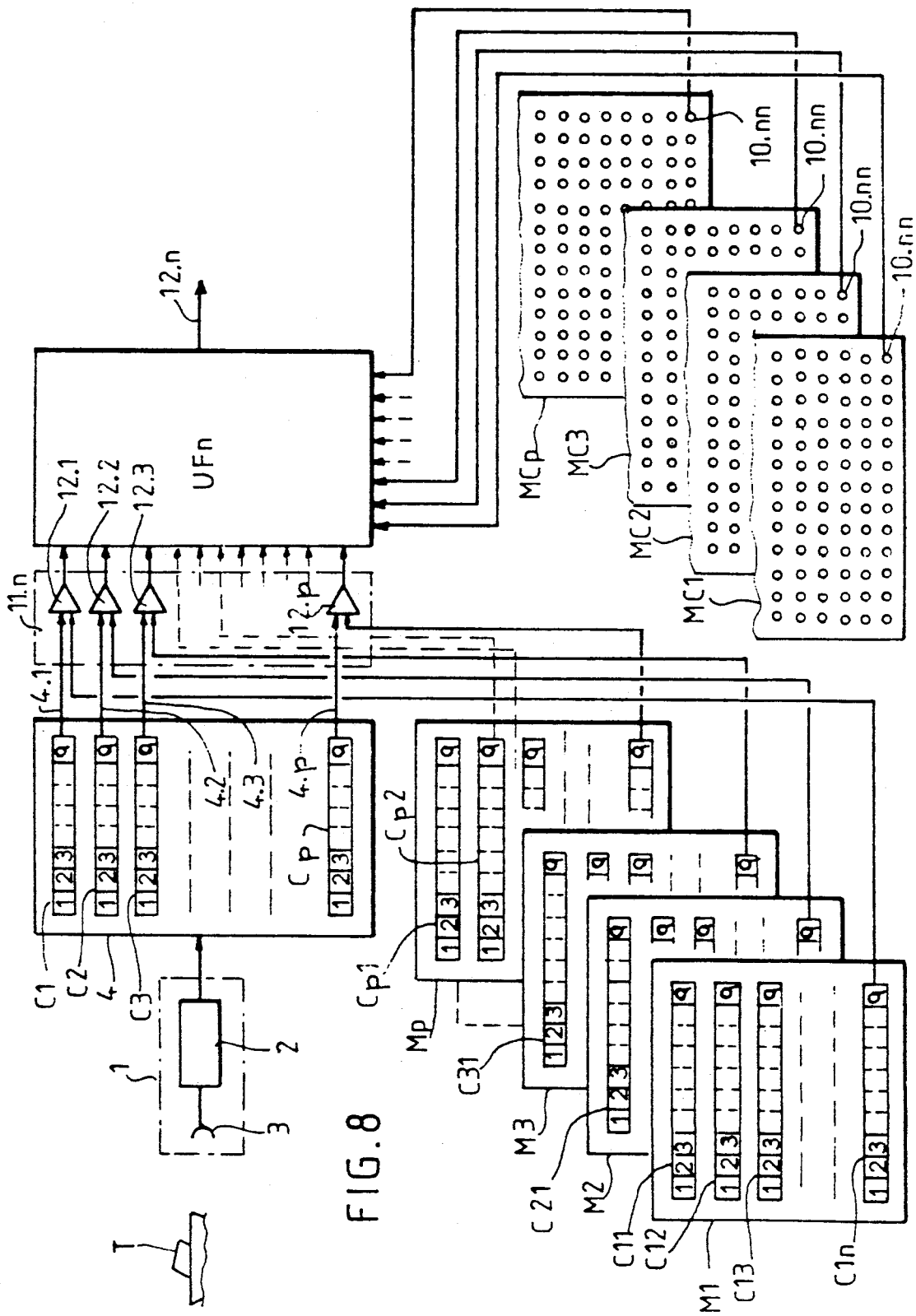

FIGS. 6 to 8 illustrate the operation of the device of FIG. 5, in the particular case where only a part of the information contained in the confusion matrices MC1 to MCp is used.

In a first step (see FIG. 6), an input of the comparators 12.1 to 12.p of the comparison assembly 11.1 is connected respectively to the corresponding output 4.1 to 4.p, whereas the other input of the comparators is connected respectively to zone C11, C21, Cp1 of memories M1 to Mp. Thus, the comparator 12.1 of the comparison assembly 11.1 receives at its input, on the one hand, the signal emitted at the output 4.1 of the extraction device 4, i.e. the present value of the criterion C1 for target T during recognition and, on the other hand, the output signal from zone C11 of memory M1, i.e. the previously recorded value of criterion C1 for target T1. At the output of comparator 21.1 of the comparison assembly 11.1 there appears then a signal representative of the probability that, for criterion C1, the target T being recognized is the target T1. Similarly, the comparator 12.2 of the comparison assembly 11.1 receives at its input, on the one hand, the signal emitted at the output 4.2 of the extraction device 4, i.e. the present value of criterion C2 for target T being recognized and, on the other hand, the output signal from zone C21 of memory M2, i.e. the previously recorded value of criterion C2 for target T1. At the output of comparator 12.2 of the comparison assembly 11.1 there appears then a signal representative of the probability that, for the criterion C2, the target T being recognized is target T1.Etc ... Finally, comparator 12.p of the comparison assembly 11.1 receives at its inputs, on the one hand, the signal emitted at the output 4p of the extraction device 4, i.e. the present value of criterion Cp for target T being recognized and, on the other hand, the output signal from zone Cp1 of memory Mp, i.e. the previously recorded value of the criterion Cp for the target T1. At the output of comparator 12.p of the comparison assembly 11.1 there appears then a signal representative of the probability that, for the criterion Cp, the target T being recognized is the target T1.

Subsequently, the comparison assembly 11.1 may address to the merging unit UF1 the different probabilities resulting from the recognition procedure and indicating that, for the criteria Ck (with k=1, 2, 3, ..., p), the target T is target T1. These probabilities are noted pCk(T1).

The merging unit UF1 further receives, from the confusion matrices MC1 to MCp, the values recorded in their positions 10.11, i.e. the different previously recorded probabilities PC1(T1), PC2(T1), ..., PCp(T1), noted hereafter PCk(T1).

The merging unit UF1 merges mathematically the different probabilities pCk(T1) and delivers at its output 13.1 a single value, with all criteria Ck merged, representative of the probability p(T1) that the target T is the target T1.

In a second step (see FIG. 7), an input of the comparators 12.1 to 12.p of the comparison assembly 11.2 is connected respectively to the corresponding output 4.1 to 4.p, whereas the other input of the comparators is connected respectively to zone C12, C22, ..., Cp2 of memories M1 to Mp. Thus, the comparator 12.1 of the comparison assembly 11.2 receives at its inputs, on the one hand, the signal emitted at the output 4.1 of the extraction device 4, i.e. the present value of the criterion C1 for target T during recognition and, on the other hand, the output signal from zone C12 of memory M1, i.e. the previously recorded value of criterion C1 for target T2. At the output of comparator 21.1 of the comparison assembly 11.2 there appears then a signal representative of the probability that, for criterion C1, the target T being recognized is the target T2. Similarly, the comparator 12.2 of the comparison assembly 11.2 receives at its inputs, on the one hand, the signal emitted at the output 4.2 of the extraction device 4, i.e. the present value of criterion C2 for target T being recognized and, on the other hand, the output signal from zone C22 of memory M2, i.e. the previously recorded value of criterion C2 for target T2. At the output of comparator 12.2 of the comparison assembly 11.2 there appears then a signal representative of the probability that, for the criterion C2, the target T being recognized is target T2.Etc ... Finally, comparator 12.p of the comparison assembly 11.2 receives at its inputs, on the one hand, the signal emitted at the output 4p of the extraction device 4, i.e. the present value of criterion Cp for target T being recognized and, on the other hand, the output signal from zone Cp2 of memory Mp, i.e. the previously recorded value of the criterion Cp for the target T2. At the output of comparator 12.p of the comparison assembly 11.2 there appears then a signal representative of the probability that, for the criterion Cp, the target T being recognized is the target T2.

Subsequently, the comparison assembly 11.2 may address to the merging unit UF2 the different probabilities resulting from the recognition procedure and indicating that, for the criteria Ck (with k=1, 2, 3, ..., p), the target T is target T2. These probabilities are noted pCk(T2).

The merging unit UF2 further receives, from the confusion matrices MC1 to MCp, the values recorded in their positions 10.22, i.e. the different previously recorded probabilities PC1(T2), PC2(T2), ..., PCp(T2), noted hereafter PCk(T2).

The merging unit UF2 merges mathematically the different probabilities pCk(T2) and delivers at its output 13.2 a single value, with all criteria Ck merged, representative of the probability p(T2) that the target T is the target T2, etc ...

In an $n^{th}$ step (see FIG. 8), an input of the comparators 12.1 to 12.p of the comparison assembly 11.n is connected respectively to the corresponding output 4.1 to 4.p, whereas the other input of the comparators is connected respectively to zone C1n, C2n, Cpn of memories M1 to Mp. Thus, the comparator 12.1 of the comparison assembly 11.n receives at its inputs, on the one hand, the signal emitted at the output 4.1 of the extraction device 4, i.e. the present value of the criterion C1 for target T during recognition and, on the other hand, the output signal from zone C1n of memory M1, i.e. the previously recorded value of criterion C1 for target Tn. At the output of comparator 21.1 of the comparison assembly 11.n there appears then a signal representative of the probability that, for criterion C1, the target T being recognized is the target Tn. Similarly, the comparator 12.2 of the comparison assembly 11.n receives at its inputs, on the one hand, the signal emitted at the output 4.2 of the extraction device 4, i.e. the present value of criterion C2 for target T being recognized and, on the other hand, the output signal from zone C2n of memory M2, i.e. the previously recorded value of criterion C2 for target Tn. At the output of comparator 12.2 of the comparison assembly 11.n there appears then a signal representative of the probability that, for the criterion C2, the target T being recognized is target Tn.Etc ... Finally, comparator 12.p of the comparison assembly 11.n receives at its inputs, on the one hand, the signal emitted at the output 4p of the extraction device 4, i.e. the present value of criterion Cp for target T being recognized and, on the other hand, the output signal from zone Cpn of memory Mp, i.e. the previously recorded value of the criterion Cp for the target Tn. At the output of comparator 12.p of the comparison assembly 11.n there appears then a signal representative of the probability that, for the criterion Cp, the target T being recognized is the target Tn.

Subsequently, the comparison assembly 11.n may address to the merging unit UFn the different probabilities resulting from the recognition procedure and indicating that, for the criteria Ck (with k=1, 2, 3, ..., p), the target T is target Tn. These probabilities are noted pCk(Tn).

The merging unit UFn further receives, from the confusion matrices MC1 to MCp, the values recorded in their positions 10.nn, i.e. the different previously recorded probabilities PC1(Tn), PC2(Tn), ..., PCp(Tn), noted hereafter PCk(Tn).

The merging unit UFn merges mathematically the different probabilities pCk(Tn) and delivers at its output 13.n a value, with all criteria Ck merged, representative of the probability p(Tn) that the target T is the target Tn, etc ...

The optimization device 14 therefore receives, from the different outputs 13.i of the merging units UFi, the different probabilities P(Ti) and it may indicate at its output 15 the number i for which the probability p(Ti) is the greatest, i.e. it indicates that the target T being recognized is the target Ti, whose particular features have been recorded.

In the device described in connection with FIGS. 6 to 8, it may be noted:

A - that each particular merging unit UFi receives from the corresponding comparison assembly 11.i the p probabilities pCk(Ti) measured during recognition, as well as the p previously recorded probabilities PCk(Ti). Each of these probabilities PCk(Ti) is a quality index of each criterion Ck with respect to each hypothesis Ti. Thus, merging of the probabilities PCk(Ti), intended to deliver the corresponding probability p(Ti) to the output of the merging unit UFi, may take into account the confidence that may be attached to said criterion;

B - that it is possible, by adding comparators 12 to the comparison assembly 11 and providing appropriate connections between the matrices M1 to Mp and said comparators, to introduce into a particular merging unit UFi not the p measured probabilities pCk(Ti) but in actual fact nxp measured probabilities pCk(Ti) by giving to the incidence i of these latter probabilities the n-1 other values 1 to n than that to which the index i of UFi corresponds. In this case, the necessary connections are also provided for addressing to the merging unit UFi the nxp corresponding recorded probabilities PCk(Ti) present in the matrix memories MCk. For clarity of the drawings, such an embodiment has not been shown.

C - Particularly in the case where the nxp measured probabilities pCk(Ti) and the nxp recorded probabilities PCk(Ti) are used for merging in each merging unit UFi, it is advantageous to bring together each measured pCk(Ti) and the corresponding recorded PCk(Ti), not to deliver a single value (certain value) but to deliver a range of values (uncertain values), merging then taking place in each merging unit UFi over nxp value ranges, to deliver the corresponding probability p(Ti).

What is claimed is:

1. Method for recognizing a target (T) among a plurality of n known targets Ti (with i=1,3,4, ..., n), wherein:
   in a first preparatory step, for each of said known targets (Ti) first values (CKi) are determined representative of a plurality of p recognition criteria Ck (with k=1,2,3, ..., p);
   in a second preparatory step, from direct examination of said n known targets (Ti), using said first values (CKi) and for each recognition criterion (Ck), nxp second values (PCk(Ti)) are established each representative of the probability for a target (Ti) to be recognized when it is examined whereas it is the target (Tj) which is examined (j=1,2,3, ..., n); and
   in a step for recognizing said target:
   by direct examination of said target (T) to be recognized and from said first values (CKi) determined by said first preparatory step, at least p third values (pCk(Ti)) are established representative of the probabilities, for each recognition criterion (Ck), that the target (T) to be recognized is each of said n known target (Ti) insofar as each of said p criteria is concerned;
   said nxp third values associated with the same known target (Ti) are merged together by taking into account said nxp second values, so as to obatin n fourth values (p(Ti)), each of which is representative of the probability that the target to be recognized is one of the known targets (Ti); and
   the identity of the target to be recognized (T) is determined from the largest of said fourth values.

2. The method as claimed in claim 1, wherein merging of said third values is obtained by using mathematical laws given by any one of the theories which are BAYES inference, entropy maximum, the theory of evidence or the theory of fuzzy sets.

3. The method as claimed in claim 1, wherein said third values are certain values.

4. The method as claimed in claim 1, wherein said third values are uncertain values.

5. The method as claimed in claim 1, wherein, in said first preparatory step, said first values are recorded criterion by criterion for all said known targets (Ti), so that all said first values of all said targets corresponding to a criterion are grouped together.

6. The method as claimed in claim 1, wherein determination of said first values is achieved by direct examination of said known targets (Ti).

7. The method as claimed in claim 1, wherein determination of said first values is achieved from models or plans of said known targets.

8. The method as claimed in claim 1, wherein, in said second preparatory step, said second values are obtained by comparison of said first values with measurement of each of said targets in accordance with each of said criteria, said measurements being repeated numerous times.

9. The method as claimed in claim 1, wherein said second values are recorded in matrix memories (MC1 to MCp), each matrix memory being associated with a criterion and in each recording position (10.ji) of such a matrix memory the probability is recorded, for said criterion, that the target (Ti) is recognized whereas the target (Tj) is subjected to direct examination.

* * * * *